(12) United States Patent
Gerardi

(10) Patent No.: US 6,253,982 B1
(45) Date of Patent: Jul. 3, 2001

(54) AUTOMOBILE CD PLAYER HOLDER

(76) Inventor: Michael M. Gerardi, 412 N. Oakhurst Dr. #202, Beverley Hills, CA (US) 90210

( * ) Notice: Subject to any disclaimer, the term of this patent is extended or adjusted under 35 U.S.C. 154(b) by 0 days.

(21) Appl. No.: 09/372,324

(22) Filed: Aug. 11, 1999

(51) Int. Cl.$^7$ ..................................................... B60R 7/04
(52) U.S. Cl. ........................... 224/544; 224/539; 224/564; 224/929; 248/311.2
(58) Field of Search ..................................... 224/929, 539, 224/542, 544, 545, 555, 556, 564, 565, 566, 567, 568; 248/311.2

(56) References Cited

U.S. PATENT DOCUMENTS

| 4,796,849 | * | 1/1989 | Fouassier ............................. 248/619 |
| 4,943,111 | * | 7/1990 | Vander Laan ................. 248/311.2 X |
| 5,060,260 | * | 10/1991 | O'Connell ....................... 224/929 X |
| 5,259,579 | * | 11/1993 | Schneider ........................... 248/311.2 |
| 5,316,368 | * | 5/1994 | Arbisi ............................. 248/311.2 X |
| 5,330,145 | * | 7/1994 | Evans et al. ....................... 248/311.2 |
| 5,490,653 | * | 2/1996 | Ingwersen ........................... 248/311.2 |
| 5,509,633 | * | 4/1996 | Ruster et al. ...................... 248/311.2 |
| 5,645,262 | * | 7/1997 | Hamlin ................................. 248/581 |
| 5,651,523 | * | 7/1997 | Bridges ............................. 248/311.2 |
| 5,676,340 | * | 10/1997 | Ruhnau ............................. 248/311.2 |
| 5,745,565 | * | 4/1998 | Wakefield ..................... 248/311.2 X |
| 5,800,011 | * | 9/1998 | Spykerman ................... 248/311.2 X |
| 5,813,583 | * | 9/1998 | Benedeti .......................... 224/929 X |
| 6,045,173 | * | 4/2000 | Tiesler et al. ................. 248/311.2 X |

FOREIGN PATENT DOCUMENTS

| 361122049 | * | 6/1986 | (JP) ...................................... 224/929 |
| 405193420 | * | 6/1986 | (JP) ...................................... 224/929 |

* cited by examiner

Primary Examiner—Gregory M Vidovich

(57) ABSTRACT

A holder for releasably securing an article within a motor vehicle equipped with a center console includes a base, means for securing the base to the center console, and means for securing the article to the base.

6 Claims, 8 Drawing Sheets

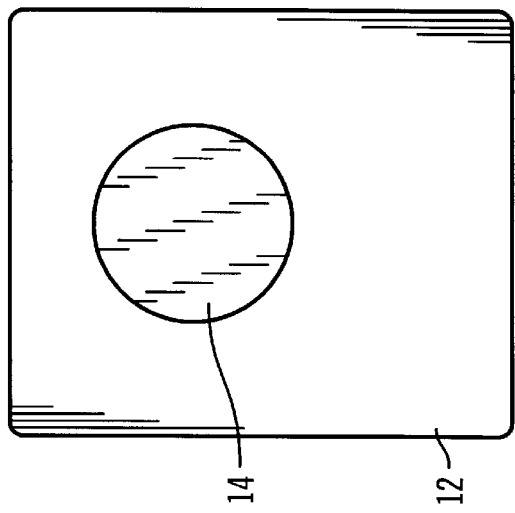
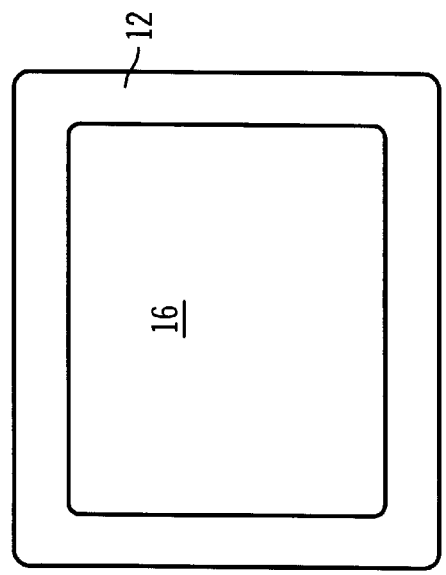
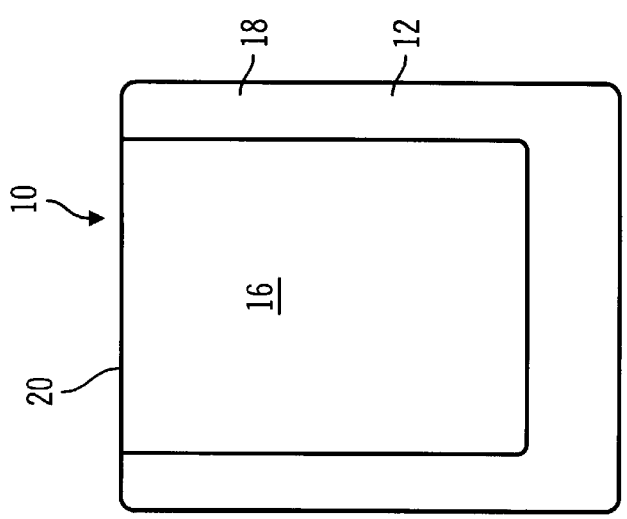
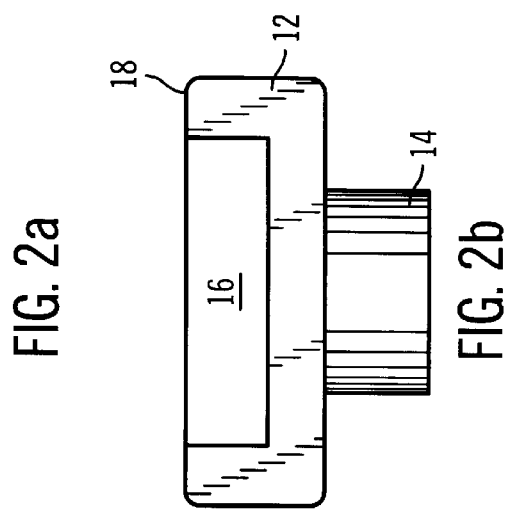
FIG. 2c
FIG. 3
FIG. 2a
FIG. 2b

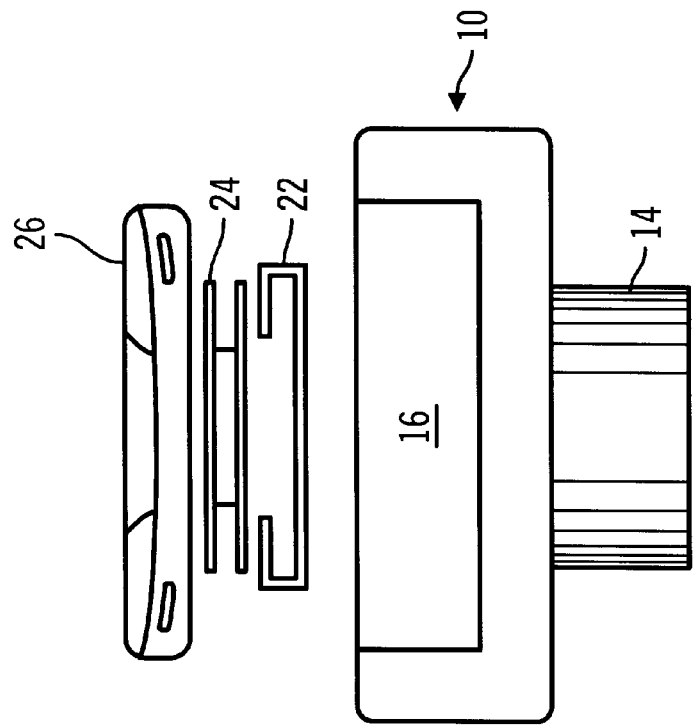
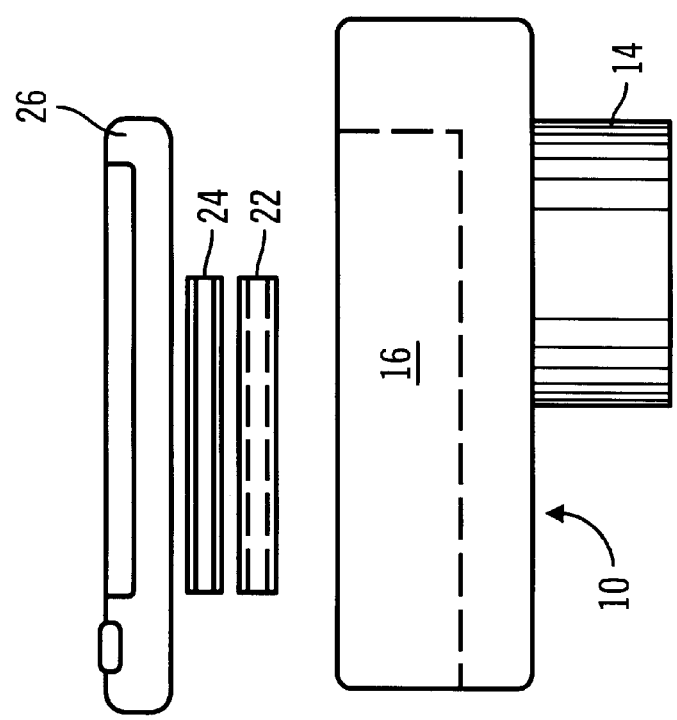

AUTOMOBILE CD PLAYER HOLDER

FIELD OF THE INVENTION

The present invention relates to devices for securing portable articles such as compact disc (CD) players, cellular telephones, small televisions and the like.

BACKGROUND OF THE INVENTION

Many modern consumer electronic devices, such as CD players, can be utilized in motor vehicles. Frequently, the motor vehicle is equipped with a cigarette lighter, and power is supplied to the electronic device by a special adapter which plugs into the cigarette lighter. Audio devices such as CD players often are also provided with adapters to facilitate playing of CD's through a tape deck that is part of the vehicle's audio system. However, motor vehicles, in particular automobiles, frequently are not equipped with receptacles or mounting surfaces which can accommodate the electronic devices. As a result, the electronic devices cannot be secured within the motor vehicles, resulting in inconvenience for the vehicle operator as well as a potential safety hazard.

A need exists for a device that secures a portable electronic device, such as a CD player, within a motor vehicle but within easy reach of the vehicle operator.

SUMMARY OF THE PREFERRED EMBODIMENTS

In accordance with one aspect of the present invention, there is provided a holder for releasably securing an article within a motor vehicle equipped with a center console. The holder includes a base, means for securing the base to the center console, and means for securing the article to the base. According to another aspect, methods for releasably securing an article within a motor vehicle are provided.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which

FIGS. 2a–c are top plan, front elevation and bottom plan views of the embodiment of FIG. 1.

FIG. 3 is a top plan view of an alternative embodiment having an enclosed receptacle for the article to be secured.

FIGS. 4a–b are exploded side and front end views of an alternative embodiment of the inventive holder which includes additional mechanical element for securing an article (as shown, a personal CD player) to the holder.

DETAILED DESCRIPTION OF THE PREFERRED EMBODIMENTS

Figure 1:
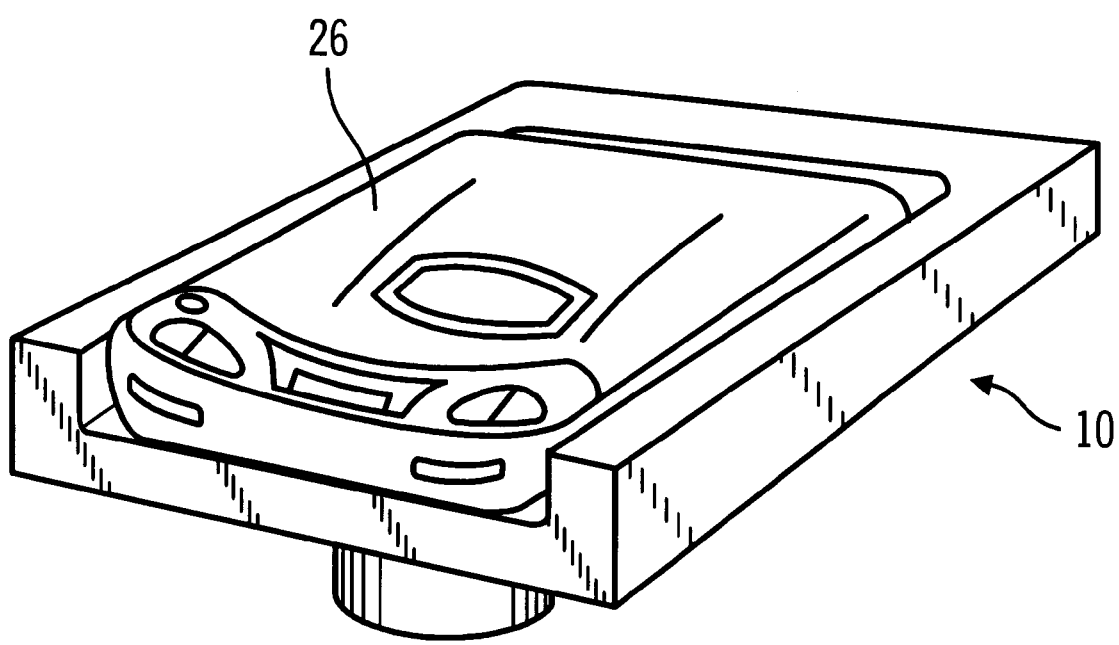
FIG. 1 is a left perspective view of a first preferred embodiment of the inventive holder for use with center consoles having cup holders, shown releasably securing a personal CD player.

As used herein, a "center console" denotes any element that extends between the driver and front passenger seats in a vehicle such as an automobile, truck, van, etc. Center consoles typically include one or more of the following: storage compartments, cup holders, stick shifts and instrument clusters. Center consoles can be affixed to, or project from, a vehicle dashboard, or can project from and/or rotate away from a point between the driver and front passenger seats.

Turning now to the drawings, in FIGS. 1 and 2a–c a first embodiment of a holder 10 according to the invention which is adapted for use with a center console having a cup holder includes a base 12, a projection 14 and a receptacle 16 defined in the upper surface 18 of base 12. Projection 14 is adapted to register within the cup holder of the center console, thereby releasably securing the base 12 to the center console. Receptacle 16 is adapted to receive an article, in particular a personal CD player, thereby securing the article to the base. Once secured, a CD player can then be played through the vehicle's audio system via a tape deck adapter (not shown) or other known means.

Receptacle 16 in FIGS. 1 and 2a–c has an open side along top edge 20 of base 12. In an alternative receptacle configuration shown in FIG. 3, receptacle 16 is completely enclosed.

In FIGS. 4a–b, receptacle 16 is provided with a slotted member 22, within which a grooved member 24 slidingly engages. Grooved member 24 in turn is affixed, for example using an adhesive, to personal CD player 26. By slidingly engaging grooved member 24 within slotted member 22, personal CD player 26 is retained more securely within receptacle 16.

If desired, the base of the inventive holder can be formed without a receptacle defined in its upper surface. The article to be retained, such as a personal CD player, is secured to the upper surface by any desired means, such as the grooved and slotted members shown in FIGS. 4a–b, by flexible fasteners such as one or more straps, by releasable adhesives applied to the upper surface of the holder and/or the bottom surface of the article to be secured, or by any other means.

Figure 5:
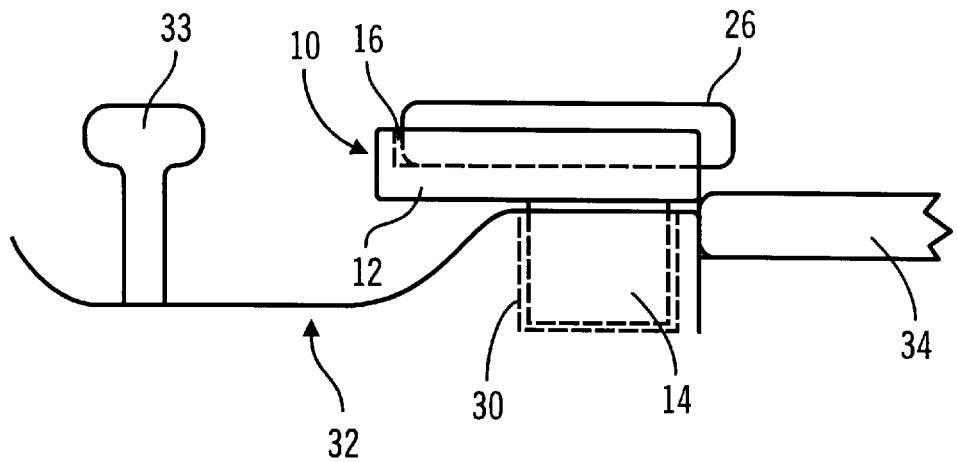
FIG. 5 is a side view showing the position of the holder of FIGS. 1 and 2a–c with respect to a center console of a vehicle that includes a cup holder.

The relationship of the holder 10 of FIGS. 1 and 2a–c to the center console of the vehicle to which it is secured is illustrated in FIG. 5. Projection 14 of holder 10 registers within cup holder 30 of console 32 and extends toward shift 33. Personal CD player 26 is secured within receptacle 16 of holder 10, and is readily accessible to the driver of the vehicle.

As illustrated, the open side of receptacle 16 faces rearward with respect to the interior of the vehicle. The open side can also be oriented to face forward.

Figure 6:
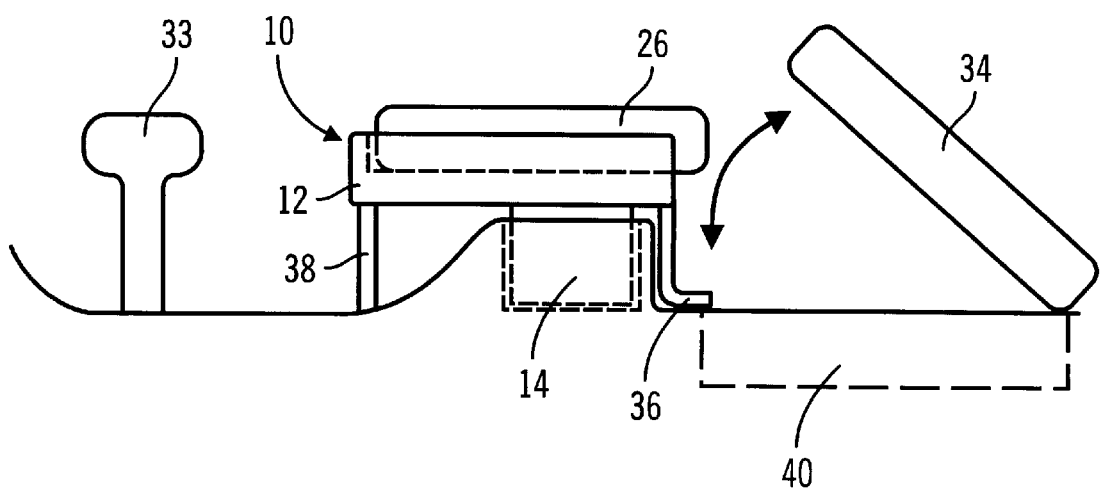
FIG. 6 is a side view of an alternative embodiment of the inventive holder which includes additional elements for securing the base thereof to the center console.
Figure 7:
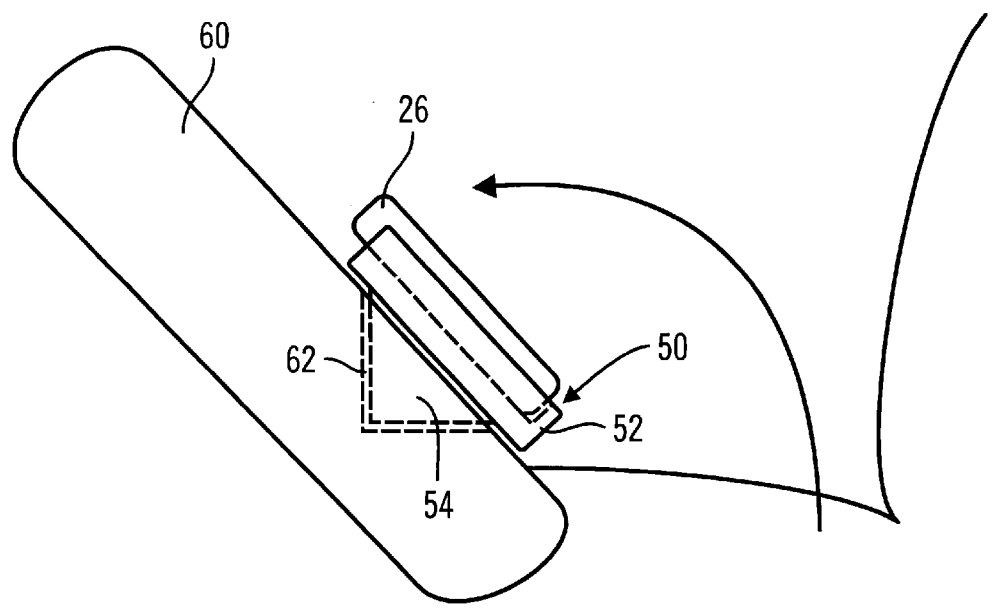
FIG. 7 is a side view of another embodiment of the inventive holder and its position relative to an inclined center console.
Figures 8A, 8B, 8C:
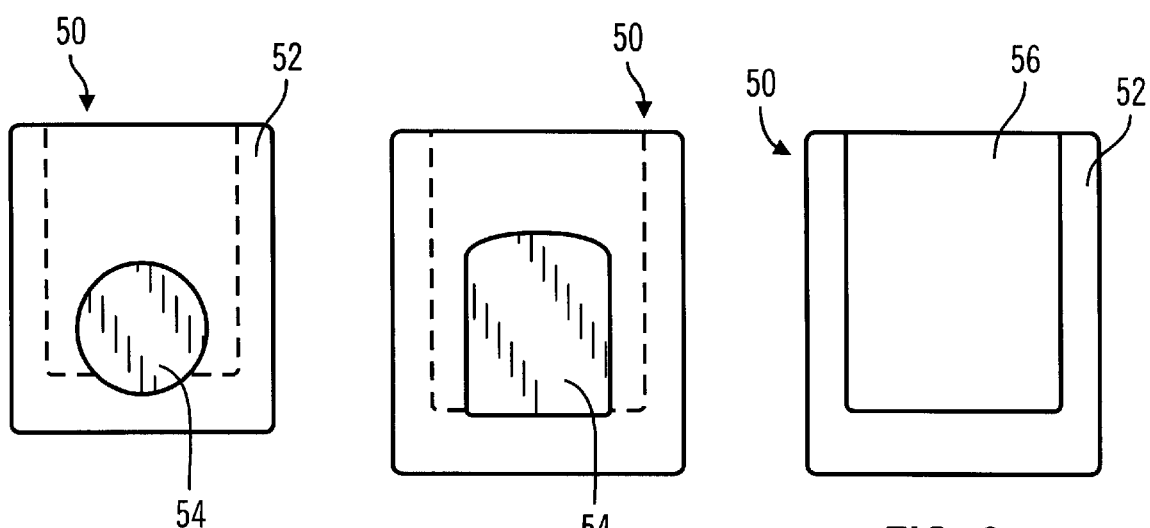
FIGS. 8a–c are bottom plan (with respect to the center projecting element), side and top plan views of the holder shown in FIG. 7, showing the angled projecting element.

For additional stability, an alternative embodiment of holder 10 illustrated in FIG. 6 is provided with a securing flange 36 which extends between and partially under cover 34 of compartment 40 defined within console 30. When cover 34 is closed, the cover holds securing flange 36 in place, thus further securing holder 10 to console 30. Additional stability is also provided by support 38 which extends downward from base 12 to contact console 32.

An alternative embodiment of a holder 50 is illustrated in FIGS. 7 and 8a–c. Some vehicles include center consoles 60 which rotate upward to form an inclined structure. Holder 50 includes base 52 and angled projection 54 adapted to register within cup holder 62 defined in the inclined console 60. A personal CD player 26 or other article is secured within receptacle 56 defined in upper surface 58 of base 52 in a manner similar to those described previously.

Other configurations of the inventive holder are that are suitable for use with center consoles having orientations and/or elements (such as covers) other than those illustrated herein will be readily apparent to those skilled in the art. All such configurations are considered to be encompassed by the present invention.

Figure 9:
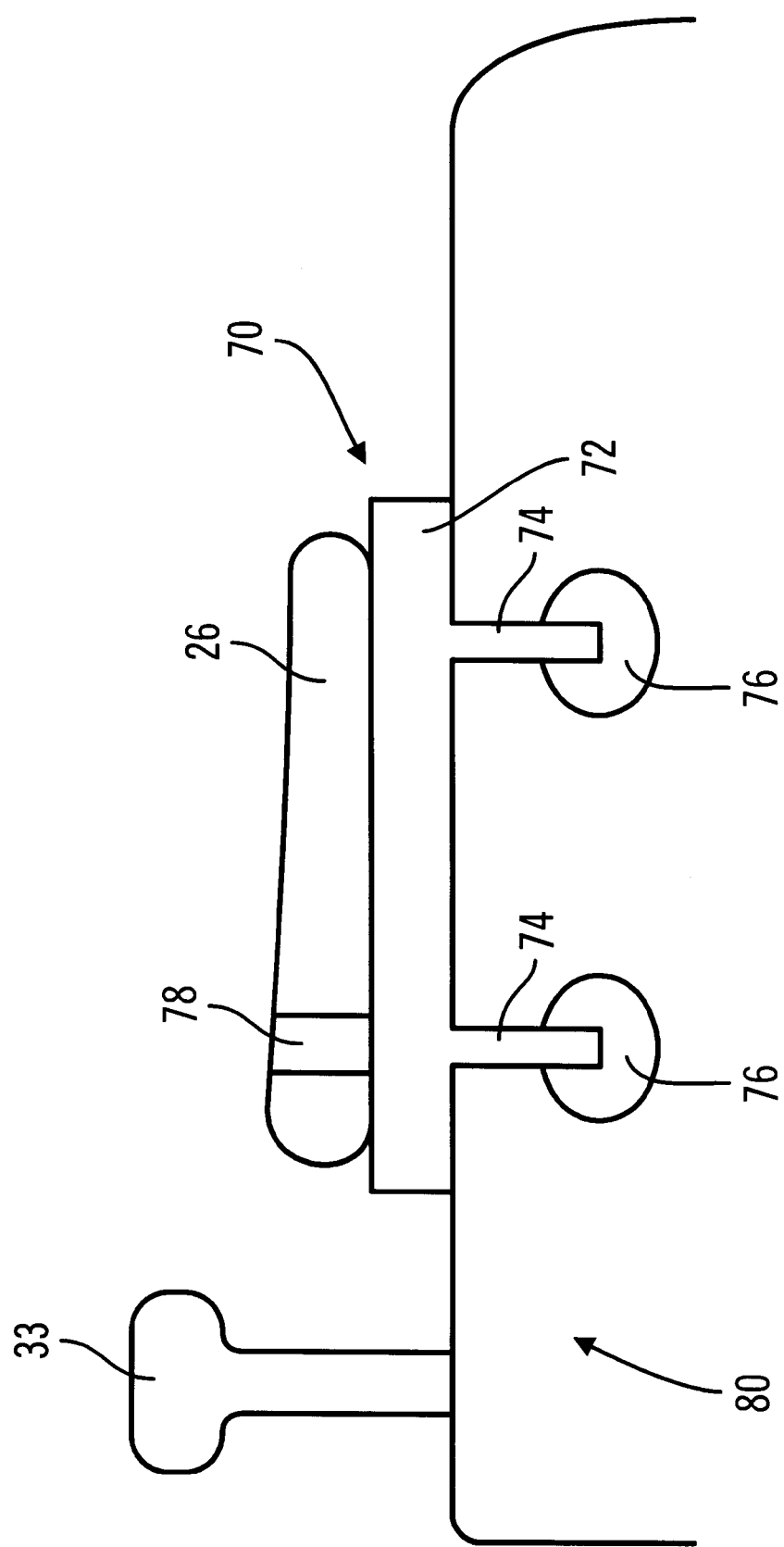
FIG. 9 is a side view of an alternative holder which is secured to a center console by suction means.

In the foregoing embodiments, the holder is releasably secured to the center console by means of a projection which registers within a cup holder defined in the center console. Other means for securing the holder (releasably or non-releasably) to a center console are also considered to be within the scope of the present invention. For example, as shown in FIG. 9, holder 70 includes a base 72 from which arms 74 downwardly project. Suction cups 76 affixed to arms 74, when pressed against console 80, secure holder 70 to the center console. Personal CD player 26 is then secured to base 72 by any desired means, such as strap 78 as shown in FIG. 9, by means of a receptacle defined in base 72 in the manner described above, or by any other means. Other means for securing the inventive holder to a center console, such as clamps, straps, adhesives, mechanical fasteners such as screws or bolts, etc. can also be used.

Figure 10B:
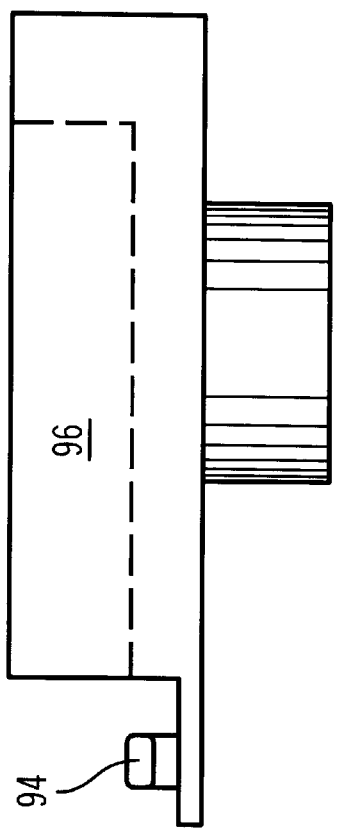
FIGS. 10a–c are top plan, side elevational and front elevational views of another embodiment of the inventive holder that includes prongs for securing any excessive length of a power cord used to supply power to the article secured by the holder.
Figure 10C:
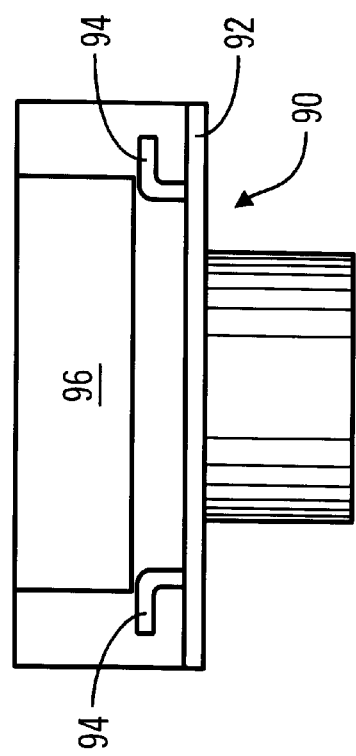
Figure 10A:
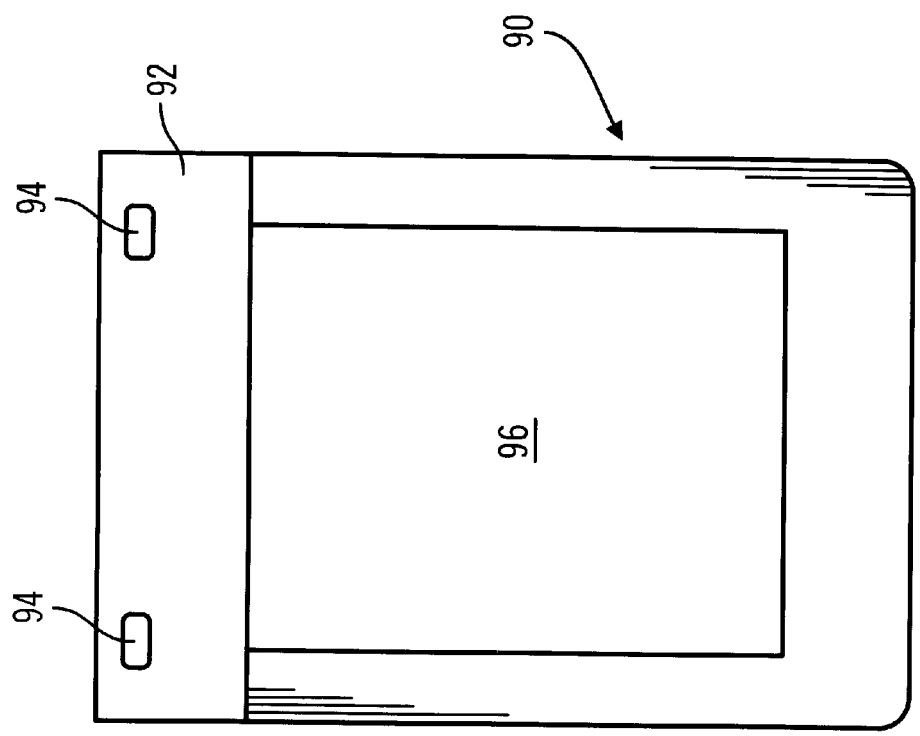

In FIGS. 10a–c, an alternative embodiment of the inventive holder 90 includes a ledge 92 and prongs 94. When an article such as a personal CD player is secured to holder 90 (in the illustration by disposing the article within receptacle 96), and a power cord (not shown) which supplies power to the article is plugged into a cigarette lighter located in the center console, any excess length of the power cord is wrapped around prongs 94 to retain the cord in place. Alternatively, excess lengths of power cord are secured by wrapping around posts or other elements, by grasping elements such as clips, by elastic devices, straps, etc. In a like manner, excess lengths of tape deck adapter cord (also not shown) can be secured.

Figure 11:
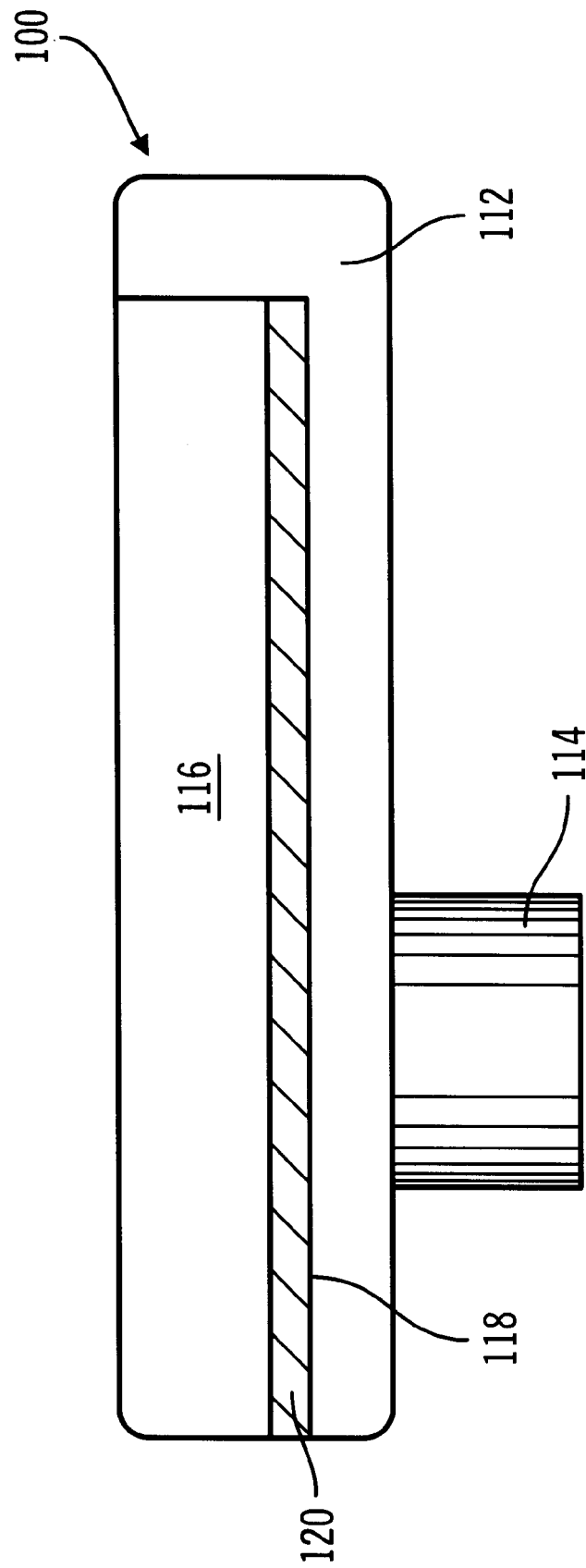
FIG. 11 is a side sectional view of an alternative embodiment of the inventive holder that includes a resilient layer for dampening vibrations transmitted from the center console to the article secured by the holder.

FIG. 11 illustrates an alternative embodiment which is particularly in situations in which excessive vibration may cause a personal CD player to skip. Holder 100 includes base 112 and projection 114, and has defined therein receptacle 116 for receiving the article to be secured, such as a personal CD player. On the lower surface 118 of receptacle 116 is disposed a resilient element 120 which dampens vibrations transmitted from the center console to the article secured to holder 100. Resilient element 120 is comprised, for example, of a layer of a resilient material such as a foamed polymer. Other resilient elements useful in accordance with the invention include packaged liquids, gels or granulated materials, air cushions, small springs, and the like.

Although the inventive holders have been illustrated primarily in relation to vehicle center consoles, they can also be adapted to be secured to other elements within a vehicle, such as the front dashboard, a ceiling projection or compartment, etc. Holders so adapted are considered to constitute part of the invention.

What is claimed is:

1. A holder for releasably securing a portable CD player within a motor vehicle equipped with a center console having a cup holder, said holder comprising:

(a) a base having an upper surface,
   (b) means for securing said base to said center console, said means comprising a projection extending from beneath said base configured to register within said cup holder of said center console, wherein said center console includes a compartment having a cover, said cover having an open position and a closed position, and said means for securing said base to said center console further comprises a flange which is adapted to be held in place by said cover when said cover is in said closed position, and
   (c) a receptacle defined in said upper surface, said receptacle having a perimeter, whereby said portable CD player registers within said receptacle.

2. The holder of claim 1 wherein said means (b) releasably secures said base to said center console.

3. The holder of claim 1 further comprising (d) means for dampening vibrations transmitted from said console to said CD player secured to said base.

4. The holder of claim 3 wherein said means (d) comprises at least one resilient element.

5. The holder of claim 1 further comprising two prongs for securing an electric cord.

6. A method for securing a portable CD player within a motor vehicle equipped with a center console having a cup holder, said method comprising the steps of:

(i) securing the holder of claim 1 to said center console such that said projection of said holder registers within said cup holder of said center console and said flange is held in place by said cover, and
   (ii) securing said CD player to said base of said holder.

* * * * *